Feb. 19, 1946.  H. L. SHOCK, JR  2,395,297
EYE SHIELD
Filed June 10, 1944
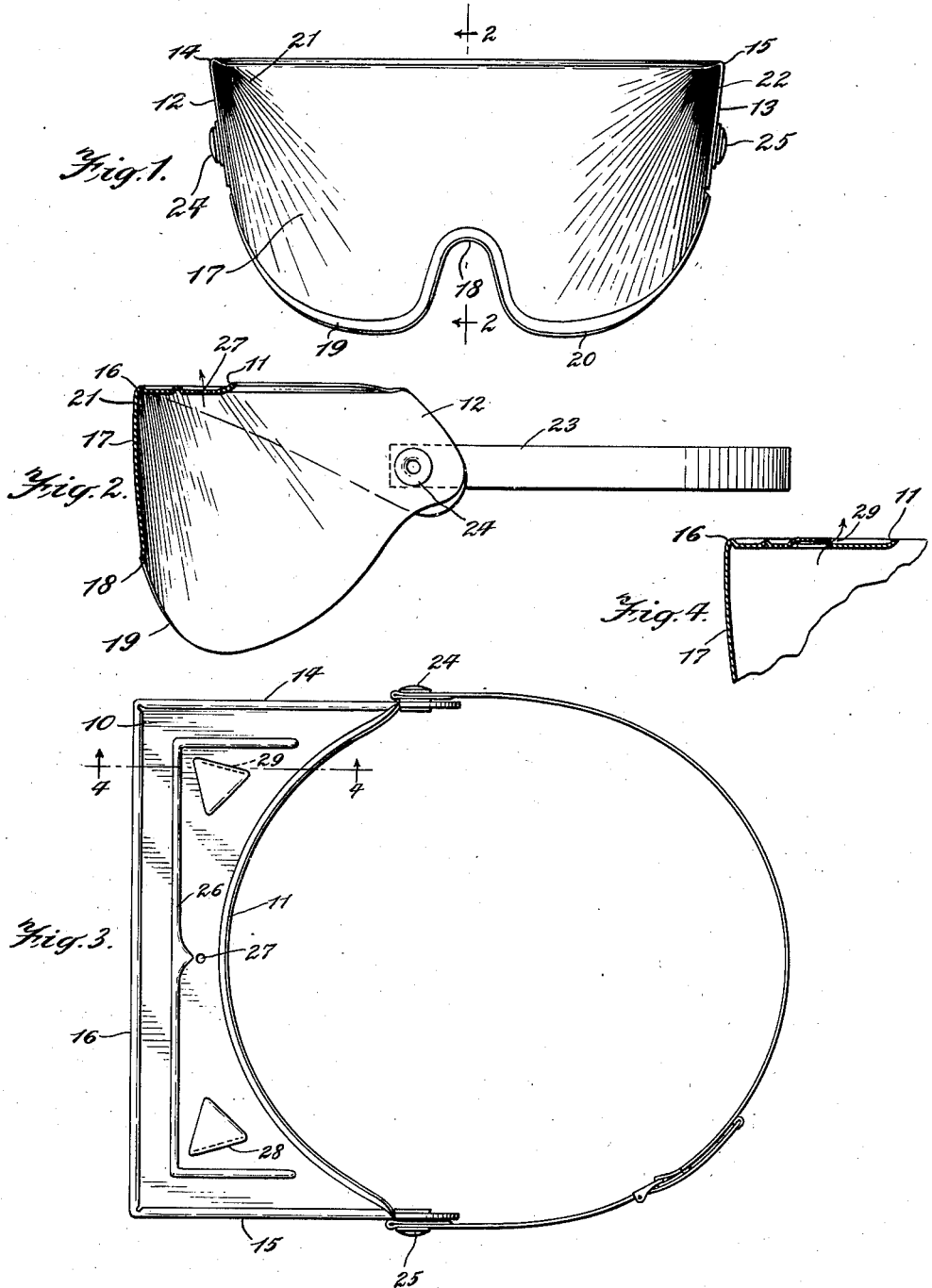
INVENTOR
Howard L. Shock, Jr.
BY
ATTORNEY Patented Feb. 19, 1946

2,395,297

UNITED STATES PATENT OFFICE 2,395,297

EYE SHIELD

Howard L. Shock, Jr., Brooklyn, N. Y., assignor to Pulmosan Safety Equipment Corporation, Brooklyn, N. Y., a corporation of New York Application June 10, 1944, Serial No. 539,728

1 Claim. (Cl. 2—14)

My invention relates to an eye shield for protecting the eyes against injury from flying or moving objects, dust, etc., and from glare.

Heretofore protection against flying or moving objects has generally been sought by means of goggles comprising eye pieces or windows of glass or other transparent material fastened to the head of the wearer immediately in front of the eyes and close to the face of the wearer by closely fitting rims or closures. Goggles of this type tended to restrict the vision and even if the closing parts were made of transparent material there was considerable diffraction and distortion except immediately in front of the eyes. Moreover goggles are uncomfortable to many wearers when worn over a considerable period of time.

My present invention provides an eye shield that affords complete eye protection from all directions while at the same time permitting unobstructed and undistorted vision in all directions, and also prevents glare particularly from light striking from above; it is also light in weight, comfortable on the face, and may be worn over eye glasses or spectacles.

In my invention I provide a one-piece shield of lightweight thin but tough plastic having a top piece to fit the forehead of the wearer and extend outwardly therefrom and which extends downwardly from the front and side edges of the top piece over the eyes to fit the nose and cheeks of the wearer. The top piece, which is approximately horizontal, is not transparent but obstructs the light either by being colored or by having its surface etched or otherwise roughened to break up and diffuse the light. The part extending downwardly from the top piece is transparent and curves in a smooth curve from the bridge of the nose to the side of the face so that light passing through the shield to the eyes has an incidence approaching a right angle regardless of the direction from which it comes. As a result when any object is viewed through the transparent portion of the shield it is not distorted by diffraction and appears substantially as it would if viewed with the naked eye.

Preferably the eye shield is made in one piece of plastic material stamped to form the top piece to a shape to fit the forehead of the wearer and with an extension from the front edge which may be bent downwardly at the front edge of the top piece and which extends beyond the side edges of the top piece so that when these extensions are brought to meet the side edges of the top piece the downward extension will curve in a smooth curve of roughly conical curvature from the front to the side.

The sides of the top piece are downturned to form flanges to which the side edges of the extension may be secured and to which may also be secured a strap for holding the shield on the head of the wearer. The lower edge of the transparent depending portion of the shield is shaped to fit the nose and cheeks of the wearer and to extend to the side of the head and the edges are preferably rounded outwardly to strengthen and stiffen them and to fit them without sharp edges. Similarly that portion of the top piece that fits against the forehead of the wearer is rolled upwardly to form a wider smooth fitting edge. The top portion of the shield is also preferably stiffened by ridges. The stiffening effect is also increased by the bending of the transparent depending portion at its juncture with the top part in a sharp angle. As a result of this strengthening and stiffening of the structure the shield may be made of relatively thin lightweight plastic material, thus providing a shield which rests easily, lightly and comfortably on the face of the wearer; and there is ample room within the shield for eyeglasses or spectacles.

The various features of the invention are illustrated, by way of example, in the accompanying drawing in which Fig. 1 is a front view of an eye shield embodying a preferred form of my invention; Fig. 2 is a vertical section of the shield taken on line 2—2 of Fig. 1; Fig. 3 is a plan view of the shield, and Fig. 4 is a vertical section taken on line 4—4 of Fig. 3.

In the embodiment of the invention shown in the accompanying drawing a top piece 10 of flat plastic material is provided having a curved rear edge 11 which is turned or rolled upwardly as shown in Figs. 2 and 4 to provide a smooth relatively wide bearing surface on the forehead of the wearer. The top piece is bent downwardly at its opposite sides to form downwardly extending flanges 12 and 13, the edges of these flanges joining the top part 10 in substantially straight corners 14 and 15. As shown in the drawing these corner edges extend directly forwardly from the curved rear edge 11 but it will be understood that they may deviate or vary somewhat from a strictly forward position if desired.

At its front end the material of the top piece is bent downwardly to form a front corner 16. This front edge or corner part extends between approximately the front ends of the side flanges 12 and 13. From the front corner 16 the transparent flexible plastic material extends downwardly as at 17 in front of the eyes of the wearer and has a lower edge which is notched as at 18 to fit the bridge of the nose and extends sidewise from the notch 18 as at 19 and 20 to fit the face of the wearer on opposite sides of the nose and thus to close in the space in front of the eyes. The downward extension 17 extends beyond the edges 14 and 15 a distance approximately equal to the edges 14 and 15 and are bent back and fitted within the flanges 12 and 13, thus causing the transparent material 17 to bend about the sides of the face to completely enclose the space in front of the wearer's eyes.

It will be apparent that this curvature of the transparent portion 17 about the corners where the front edge 16 of the top piece joins the side edges 14 and 15 will assume a somewhat conical curvature as indicated at 21 and 22 which provides a rounded surface giving a minimum of distortion of light passing from any angle to the eyes of the wearer.

A securing band or strap 23 is secured to the flanges 12 and 13 by means of eyelets 24 and 25. And it will also be apparent that when tension is applied to the strap or band 23 it will be applied at a level between the top of the notch 18 and curved edge 11 of the top piece and draw the shield into close contact with the forehead and face.

The eyelets 24 and 25 also serve to secure the bent back portions of the extension or transparent portion 17 to the downwardly extending flanges 12 and 13. Also the bent back portions are held tightly against the inner surface of the flanges 12 and 13 by the natural resiliency of the material.

In order to prevent light striking downwardly or from passing through the top piece and being reflected from the inclined face of the transparent portion 17 into the wearer's eyes, the top piece 10 is made to obstruct light either by coating or dyeing it with a color that will absorb a considerable part of the light, or by frosting or etching it to diffuse the light and prevent glare. Consequently the only light that may enter the eye shield without being diffused or diminished is through the transparent portion 17.

The bending of the plastic material downwardly at the edges 14, 15 and 16 tends to stiffen the top piece but it may also be further stiffened by the rolling upwardly of the edge 11 and by means of a ridge or groove 26 approximately parallel to the edges 14, 15 and 16.

Ventilating openings, as at 27, 28 and 29 may be provided in the top piece 10 to facilitate ventilation.

It will also be understood that the bending and curvature of the transparent portion 17 also stiffens and strengthens the shield. It is therefore possible to provide a strong rigid structure with relatively thin sheets of plastic material. Also the curvature of the transparent sheet or portion 17 makes it more resistant to penetration by a flying particle or object as it may yield slightly upon impact and affords greater opportunity for such particles or objects to glance off from the rounded surface.

It will be noted that the top piece 10 projects a substantial distance beyond the forehead so that no part of the shield will interfere with or obstruct spectacles or eyeglasses worn by the wearer within the shield.

The shield because of its light weight and freedom of diffraction of light may be worn for long periods of time without discomfort or annoyance to the wearer.

What I claim is:

An eye shield comprising a plastic sheet bent downwardly on a pair of straight side lines and on a straight front line to define a substantially flat horizontal top having a straight front edge and straight side edges to form a pair of downward side flanges at substantially a right angle to the plane of said top and to form a transparent wall extending downwardly from said front edge at substantially a right angle to the plane of said top and thence extending sidewise against said side flanges, said wall curving in a conical curvature from front to sides, said top having a rear edge curved to fit a forehead and said wall having a lower edge curved to fit the face of the wearer below the eyes.

HOWARD L. SHOCK, Jr.